United States Patent
Reuter

[11] Patent Number: 5,669,673
[45] Date of Patent: Sep. 23, 1997

[54] DIRECT POWER BOOSTER RESPONSE SYSTEM

[75] Inventor: David Fredrick Reuter, Beavercreek, Ohio

[73] Assignee: General Motors Corporation, Detroit, Mich.

[21] Appl. No.: 636,485

[22] Filed: Apr. 23, 1996

[51] Int. Cl.⁶ .................................................. B60T 15/04
[52] U.S. Cl. .................... 303/10; 188/358; 303/114.1; 303/113.2; 60/547.1
[58] Field of Search ................................. 188/358, 359; 303/114.1, 114.2, 10, 116.1, 113.2, 115.1, 115.4, 115.5, 50–56, 146, 182; 60/547.1, 548, 582; 91/6, 49, 431

[56] References Cited

U.S. PATENT DOCUMENTS

| | | | |
|---|---|---|---|
| 2,757,512 | 8/1956 | Foreman | 188/359 |
| 2,887,187 | 5/1959 | Fletcher et al. | 188/358 |
| 4,181,064 | 1/1980 | Flory | 91/6 |
| 4,923,256 | 5/1990 | Belart et al. | 188/358 |
| 5,066,077 | 11/1991 | Farr | 303/114.1 |
| 5,306,075 | 4/1994 | Matsuda et al. | 303/10 |
| 5,549,361 | 8/1996 | Sorensen | 303/10 |

*Primary Examiner*—Douglas C. Butler
*Attorney, Agent, or Firm*—Jeffrey A. Sedlar

[57] ABSTRACT

An integral power booster and master cylinder assembly interactively operates with a braking system to effect conventional braking operation, anti-lock brake operation, traction control operation and stability enhancement system functions in a cost effective manner. The incorporation of a low pressure hydraulic booster provides a manner of enhancing first cycle response times of the traction control and stability enhancement system functions. Fluid separation is maintained between the stability enhancement system and the braking channels through the use of a pump priming accumulator to provide a pre-charge to the wheel brake pressure effecting pump assembly, in direct response to the power booster.

15 Claims, 2 Drawing Sheets

DIRECT POWER BOOSTER RESPONSE SYSTEM

BACKGROUND OF THE INVENTION

The present invention relates to a direct power booster response system and more particularly, to a closed-loop system with an integral low-pressure, master cylinder power booster wherein base brake pedal force requirements are reduced and first cycle response is optimized by direct power booster intervention.

A typical master cylinder power booster intensifies a manual input force and applies it to the master cylinder to effect pressurization of an associated braking system. Within the master cylinder selective movement of primary and secondary pistons develops elevated fluid pressure which is transmitted to the braking system. During base brake operation, the primary and secondary pistons generate operating fluid pressure which is used to actuate brake calipers or wheel cylinders at each vehicle wheel brake.

It is typical for an automotive braking system to operate in the traditional base brake mode wherein manual actuation of the master cylinder effects a desired application of the wheel brakes with assistance from the power booster. In addition to the base brake mode of operation, braking systems are often capable of controlling vehicle deceleration through anti-lock operation, controlling vehicle acceleration through traction control operation, and improving lateral and longitudinal vehicle stability through stability enhancement systems which provide a level of dynamic handling augmentation.

During operation of the anti-lock braking, traction control and stability enhancement systems, the typical master cylinder and power booster are isolated from the remainder of the braking system and power is effected through an ancillary pressure generation mechanism such as a motor driven pump. With this type of conventionally powered system, when wheel braking pressure is required for effecting traction control operation or stability enhancement system operation, the ancillary pressure generation mechanism is operated to supply the required fluid pressure to the system.

Within the context of a stability enhancement system, wherein a braking function is applied to a vehicle wheel to adjust its actual path upon sensed deviation from the intended vehicle path, first cycle response times are important. In order to effect a fast first cycle response time a relatively large motor and pump combination are typically required and therefore, are utilized. This approach is limited however, by high fluid viscosity conditions which cause restrictions in flow to the pump inlet. Another known method of providing a fast first cycle response time is to utilize a separate high pressure accumulator to store a fluid pre-charge which can be applied to the vehicle wheel brakes when required. These characteristics of known vehicle stability enhancement systems are somewhat undesirable since they tend to increase the overall costs of the system.

SUMMARY OF THE INVENTION

It is an aim of the present invention to provide a vehicle braking system with an integral power booster that operates with a fast first cycle response time for both base brake operation and when auxiliary braking intervention with no driver assist is provided. This is accomplished by means of the present invention at a relatively low cost through utilization of an economical low pressure power source. A direct power booster base brake system according to a preferred embodiment of the present invention includes a hydraulic power booster that associates with the vehicle's master cylinder. The power booster carries a low pressure accumulator that is preferably maintained with a fluid charge of between 500–700 psi.

The accumulator is in continuous communication with a longitudinal bore of the power booster which carries the power piston. An accumulator pump is provided which communicates with the longitudinal bore. The pump is operable to maintain the fluid charge in the accumulator. A second pump is optionally utilized which provides fluid pressure modulation for wheel brake control during prefered anti-lock braking system operation, traction control brake operation-or stability enhancement system brake operation. The fluid charge carried in the accumulator and maintained therein by the first pump for the primary functioning of the hydraulic booster is communicable through the braking system to provide a pre-charge to the system, assisting the second pump in appling pressure to wheel brakes at an increased rate when preferable.

DETAILED DESCRIPTION OF THE PRESENTLY PREFERRED EMBODIMENT

Figure 1:
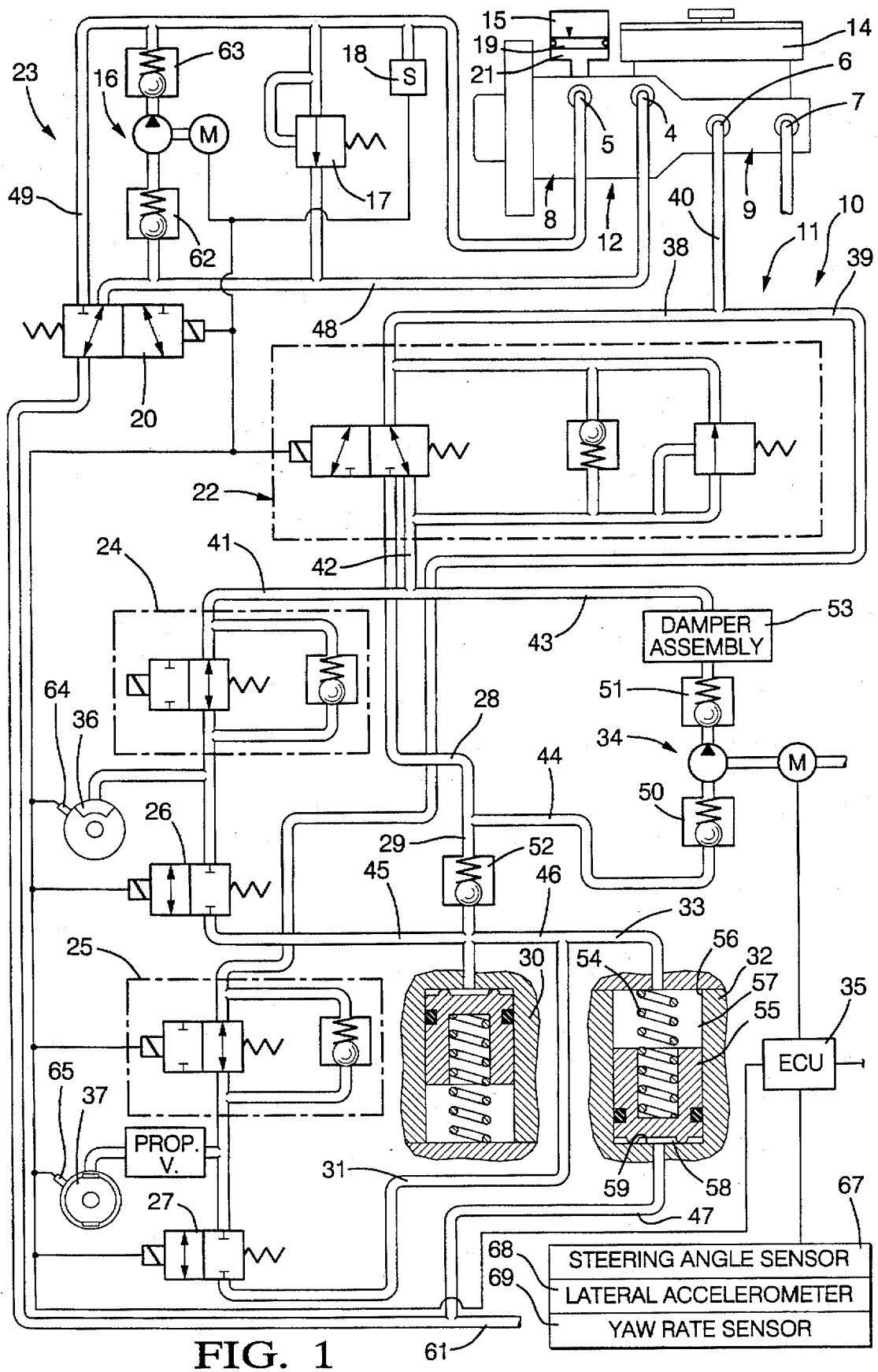
FIG. 1 is a diagrammatic illustration of a direct power booster response system with an integral power booster and master cylinder.

Referring to the drawings, illustrated in FIG. 1 is a power booster response system designated in the aggregate as 10. The power booster 8 is illustrated as part of an integral power booster and master cylinder assembly 12 in combination with the master cylinder 9. The master cylinder 9 is effective to pressurize dual braking circuits through output ports 6 and 7. Only one braking circuit is illustrated in detail as supplied by output port 6 with the braking circuit supplied from output port 7 being substantially identical.

The power booster 8 communicates externally with components of the direct power booster response system 10 through reservoir port 4 and accumulator port 5. Power booster 8 carries a gas charged accumulator 15. Accumulator 15 includes a movable piston 19, or alternatively a conventional moveable membrane (not illustrated), and a fluid chamber 21. Fluid chamber 21 is in constant communication with the accumulator port 5 internally, through the power booster 8. The power booster and master cylinder assembly 12 carries a fluid reservoir 14 which holds a supply of fluid that is continuously communicable to the booster reservoir port 4 internally, through the power booster 8.

The braking circuit supplied by the output port 6 of master cylinder 9 is designated as braking channel 11. Braking channel 11 includes one front wheel brake 36 and one rear wheel brake 37. In the embodiment illustrated, front wheel brake 36 is a driven wheel and rear wheel brake 37 is a non-driven wheel of the associated vehicle (not illustrated). The braking channel 11 is therefore, configured as part of a commonly known dual channel, diagonally split system. Alternatively, the system can also be configured in the commonly known front/rear split arrangement (not illustrated), or other conventionally known arrangements.

Each wheel brake 36 and 37 is provided with a dual anti-lock braking system (ABS), controlled valve arrangement. To this end, front wheel brake 36 has an associating normally open solenoid valve 24 which is configured as a two-position, two-way valve with integral check valve. Front wheel brake 36 also has an associating normally closed solenoid valve 26 which is configured as a two-position, two-way valve. Rear wheel brake 37 has an associating optional proportional valve which proportions the fluid pressure in a pre-selected manner between the front wheel brake 36 and the rear wheel brake 37. Rear wheel brake 37 has an associating normally open solenoid valve 25 which is configured as a two-position, two-way valve with integral check valve. Rear wheel brake 37 also has an associating normally closed solenoid valve 27 which is configured as a two-position, two-way valve.

The braking circuit 11 includes a conduit 40 that extends from output port 6 of master cylinder 9 and diverges into two branches 38 and 39. Branch 38 extends to traction control valve 22 and the branch 39 extends to normally open solenoid valve 25. The traction control valve 22 is provided in the branch 38 of conduit 40 that supplies front wheel brake 36. Traction control valve 22 comprises a solenoid operated two-position, two-way valve with integral check and pressure relief features. An alternative to the illustrated configuration is to connect branch line 39 to conduit 42 instead of conduit 40, so that traction control pressurization is supplied to both wheel brake 36 and wheel brake 37 simultaneously.

Traction control valve 22 is normally placed in an operating state such that the branch 38 of conduit 40 is placed in fluid communication with conduit 42. Conduit 42 also diverges into two branches 41 and 43. Branch 41 leads directly to normally open solenoid valve 24 and the branch 43 extends to the outlet of pump assembly 34. The inlet of pump assembly 34 is supplied by a conduit 44 which includes a branch 28 that extends to a normally closed port of traction control valve 22 and a branch 29 that extends to pump inlet accumulator 30.

The branch 29 that extends to pump inlet accumulator 30 is intersected by conduits 45 and Conduit 45 extends to normally closed solenoid valve 26 of front wheel brake 36 and conduit 46 includes a branch 31 that extends to normally closed solenoid valve 27 of rear wheel brake 37. Conduit 46 also includes a branch 33 that extends to pump priming accumulator 32. Check valves 50 and 51 are provided as part of pump assembly 34 and check valve 52 is provided in the branch 29 of conduit 44 which extends between pump inlet accumulator 30 and the inlet of pump assembly 34. The pump assembly 34 also includes an optional output damper assembly 53 to reduce the effects of potential noise generated by pump assembly Pump priming accumulator 32 includes a piston 55 that is slidably carried in bore 56. Piston 55 separates two fluid chambers 57 and 58 within the bore 56. The piston 55 is biased toward the end 59 of bore 56 by a spring 54. The fluid chamber 57 is in communication with and opens to conduit 46 and the fluid chamber 58 is in fluid communication with and opens to conduit 47. Conduit 47 extends to integral chassis system valve 20. Conduit 47 includes a branch 61 that extends to an additional braking channel (not illustrated), that is supplied by output port 7 of master cylinder 9 and is substantially identical to braking channel 11.

The integral chassis system valve 20 is embodied as a two-position, three-way solenoid operated valve and in its normal, de-energized position opens a first port to a second port through the integral chassis system valve, placing conduit 47 in fluid communication with conduit 48. Conduit 48 extends to reservoir port 4 of power booster 8. The third normally closed port of integral chassis system valve 20 is connected to conduit 49 which extends to accumulator port 5 of power booster 8.

A pump assembly 16 is provided with inlet and outlet check valves 62 and 63 respectively, and has its inlet side connected to conduit 48 and its outlet side connected to conduit 49. A pressure relief valve 17 is provided which limits the maximum pressure in conduit 49 by discharging excessive pressure to conduit 48 for return to reservoir 14 through reservoir port 4 of power booster 8.

Conduit 49 also communicates with a pressure transducer 18 which senses the pressure level therein. The normal position of the integral chassis system valve 20 provides fluid communication between the conduits 47 and 48 so that the fluid in chamber 58 of pump priming accumulator 32 is released to the reservoir 14 through reservoir port 4 and internally through power booster 8. Therefore, the spring 54 returns piston 55 to the normal position illustrated against the end 59 of bore 56.

An electronic control unit 35 is provided to effect operation of the pump assemblies 34 and 16. The ECU 35 also controls the solenoid effected shifting of valves 20, 22 and 24–27 from their normal positions. When a control signal from the ECU 35 to the valves is absent they are returned to their normal, illustrated, de-energized positions by return springs. The ECU 35 receives input from various sources including pressure transducer 18, wheel speed sensors 64 and 65, a steering angle sensor 67, a lateral accelerometer 68 and a yaw rate sensor 69.

Operation of the direct power booster response system 10 is characterized by the feature that the power booster 8 is operable to provide power assist in the actuation of master cylinder 9 and is also operable in the stability enhancement system 23 and in traction control functions. To enable such operations, the accumulator 15 is selectively operable to effect transmission of the fluid charge from fluid chamber 21 to the power booster 8 to provide power assist in the actuation master cylinder 9, and the accumulator 15 is also selectively operable to effect transmission of the fluid charge through accumulator port 5 to the stability enhancement system 23.

In addition, the power booster 8 includes a means of communicating excess fluid to the reservoir 14. The power booster 8 also includes a mechanism for drawing fluid requirements from the reservoir 14 while providing continuously open communication between the reservoir port 4 and the reservoir 14. These features are provided by the integral power booster and master cylinder assembly 12 which is illustrated in greater detail in FIG. 2.

Figure 2:
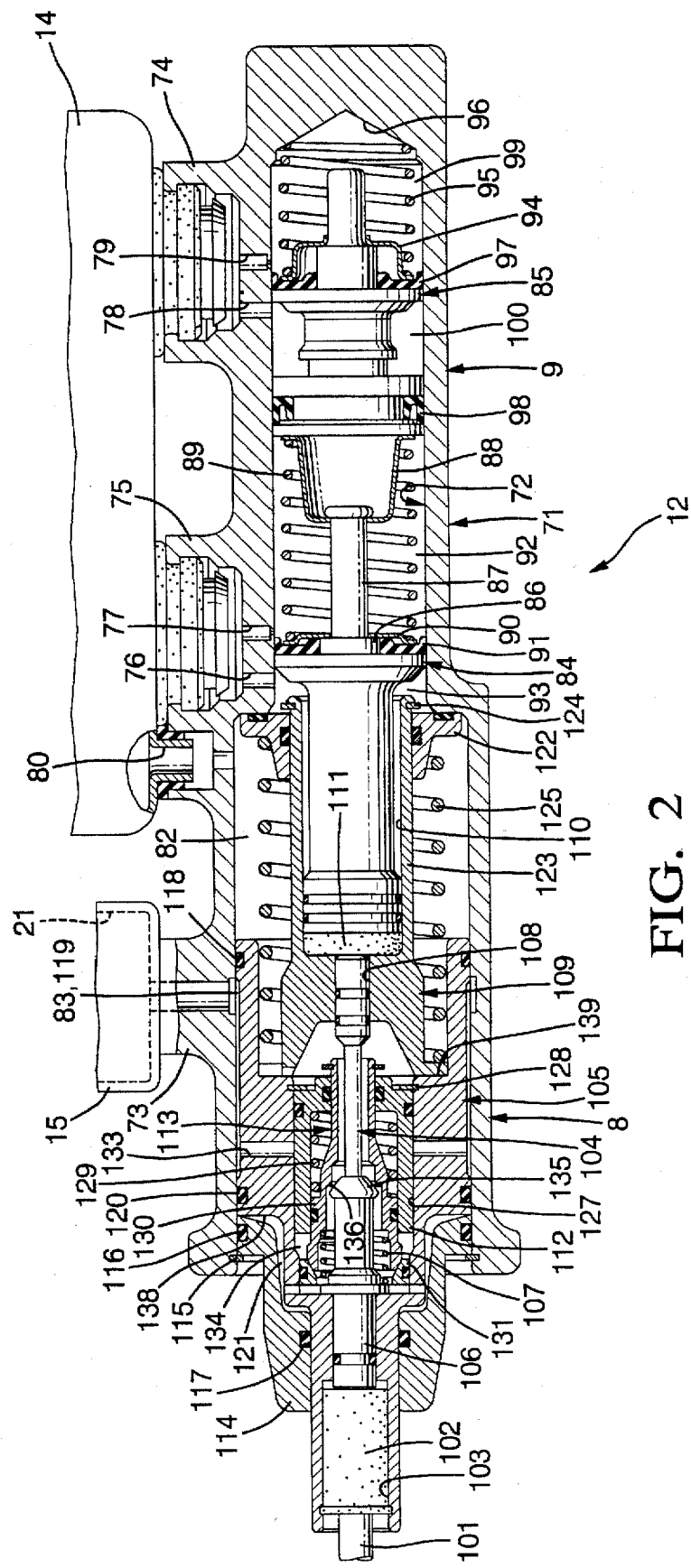
FIG. 2 is a fragmentary cross sectional illustration of the power booster and master cylinder assembly of FIG. 1.

Referring to FIG. 2, the integral power booster and master cylinder assembly 12 includes master cylinder 9 and power booster 8 which are housed in a one-piece body 71. The body 71 includes a stepped longitudinal bore 72 which carries the longitudinally translatable master cylinder and power booster components. The reservoir 14 is carried on bosses 74 and 75 of body 71 and fluid communication is provided from the reservoir 14 to the stepped longitudinal bore 72 through compensation ports 76 and 78 and bypass ports 77 and 79. A separate communication port 80 also provides an open fluid channel between the reservoir 14 and chamber 82 of stepped longitudinal bore 72. The accumulator 15 is carried on boss 73 of body 71 and the fluid chamber 21 communicates with chamber 83 of stepped longitudinal bore 72.

The master cylinder 9, within stepped longitudinal bore 72, carries a tandem piston arrangement including primary piston 84 and secondary piston 85. The primary piston 84 is arranged in a sub-assembly that includes a spring retainer 88 which is slidably retained on a piston extension 86 by means of a fastener 87. A return spring 89 is carried between spring retainer 88 and a second spring retainer 90 that is carried against piston extension 86 by a fastener 87. The primary piston sub-assembly also includes a seal 91 that engages the body 71 within stepped longitudinal bore 72 effecting fluid separation between a primary high pressure chamber 92 and a primary low pressure chamber 93 in the stepped longitudinal bore 72. The primary piston 84 is operable to selectively pressurize braking channel 11 as illustrated in FIG. 1, through the outlet port 6.

Secondary piston 85 is substantially spool-shaped and is slidably carried in longitudinal bore 72 forward of primary piston 84. Secondary piston 85 is engaged by spring retainer 88 of the primary piston sub-assembly. A spring retainer 94 is carried on secondary piston 85 and a return spring 95 extends between the spring retainer 94 and the end 96 of stepped longitudinal bore 72, biasing the secondary piston 85 toward the primary piston 84.

Secondary piston 85 carries a primary seal 97 separating longitudinal bore 72 into secondary high pressure chamber 99 and secondary low pressure chamber 100 in the stepped longitudinal bore 72. Secondary piston 85 also carries a secondary seal 98 that separates secondary low pressure chamber 100 from primary high pressure chamber 92 within stepped longitudinal bore 72. The secondary piston 85 is operable to selectively pressurize a braking channel (not illustrated), like braking channel 11, through the outlet port 7 of master cylinder 9 as illustrated in FIG. 1.

The bypass port 79 provides interruptible fluid communication between the reservoir 14 and the secondary high pressure chamber 99. The compensation port 78 provides continuous fluid communication between the reservoir 14 and the secondary low pressure chamber 100. The bypass port 77 provides interruptible fluid communication through boss 75 between reservoir 14 and primary high pressure chamber 92. The compensation port 76 provides continuous fluid communication through the boss 75 between reservoir 14 and the primary low pressure chamber 93. Through this configuration the primary and secondary pistons 84, 85 are operable to selectively pressurize a dual channel braking system in a conventional manner.

The master cylinder 9 is actuated by means of a push rod 101 which is selectively manually operable. The push rod 101 effects actuation of the master cylinder 9 through means of the power booster 8. The push rod 101 is captured within retainer 102 which is slidably carried in bore 103 of power piston 105. The retainer 102 engages valve plunger 106 which is biased toward the retainer 102 by a spring 107. Valve plunger 106 engages reaction piston 104 which is slidably carried in bore 108 of reaction body 109.

The primary piston 84 is slidably supported in bore 110 of reaction body 109 with a reaction disc 111. Reaction disc 111 is positioned between the primary piston 84 and the reaction piston 104. The manual application of force to push rod 101 is transmitted to retainer 102 and therethrough, to valve plunger 106. Valve plunger 106 transfers the applied force to reaction piston 104 which applies the force to reaction disc 111 and therethrough, to primary piston 84. Therefore, the actuation of master cylinder 9 is effected through the manual application of force to push rod 101.

Additionally, hydraulic power boost in proportion to the input force supplied at push rod 101, is provided by means of the power booster 8 to assist the manually applied force in actuating the master cylinder 9. The power piston 105 is operable in response to hydraulic pressure to apply power assist in response to manual actuation to the reaction body 109 to assist in actuation of the master cylinder 9.

The power piston 105 is slidably carried in stepped longitudinal bore 72 and is fixed therein by means of rear housing 114 which is held in position by a retainer 115. The rear housing 114 carries seal 116 which engages the body 71 in stepped longitudinal bore 72 and seal 117 which engages the power piston 105 to provide a fluid-tight seal for the power booster 8. The power piston 105 carries seal 118 which separates interior reservoir chamber 82 from charge chamber 119 and seal 120 which separates charge chamber 119 from power chamber 121. A seal ring 122 encircles the annular leg 123 of reaction body 109 and is retained thereon for assembly purposes by retainer 124. The seal ring 122 engages the body 71 and the annular leg 123 providing fluid separation between the primary low pressure chamber 93 of the master cylinder 8 and chamber 82 of the power booster 9. Both chambers 93 and 82 are open to the reservoir 14. A spring 125 extends between the seal ring 122 and the annular leg 123 biasing the reaction body 109 and the power piston 105 toward the rear housing 114.

The power piston 105 includes a longitudinal bore 127 which carries a valve sleeve 112 that is retained therein by retainer 128. The valve sleeve 112 carries a slidable valve body 113 with a spring 129 extending between the valve sleeve 112 in the valve body 113 biasing the annular leg 130 into engagement with ring 131. The power piston 105 also includes a transverse bore 133 which permits fluid communication between the longitudinal bore 127 and the charge chamber 119.

The chamber 82 is in fluid communication with the reservoir 14 through the communication port 80 and conduit 48 through reservoir port 4 as illustrated in FIG. 1. The charge chamber 119 is in fluid communication with the fluid chamber 21 of accumulator 15 and with the conduit 49 through accumulator port 5 as shown in FIG. 1.

The accumulator pump assembly 16 is operable to maintain a fluid pressure charge in the charge chamber 119 within the range of approximately 500–700 psi at all times. Maintenance of this fluid charge is assisted by means of the accumulator 15. The fluid charge is maintained within the charge chamber 119, fluid chamber 21 of accumulator 15 and internally within the power booster 8 within transverse bore 133, longitudinal bore 127 between valve sleeve 112 and power piston 105 and the annular valve chamber 134. As shown in FIG. 1, the pressure charge is also maintained in conduit 49 between accumulator port 5 and integral chassis system valve 20.

In operation, upon the manual application of force to push rod 101 the valve plunger 106 is caused to compress the spring 107 so that the element 135 closes against the seat 136 so that the force is transmitted to valve body 113 compressing spring 129 and causing the valve body 113 to slide within the valve sleeve 112 separating the annular leg 130 from the ring 131. This opens a fluid flow path from the annular chamber 134 between the annular leg 130 and ring 131 to the power chamber 121. The fluid charge that is maintained in the charge chamber 119 is applied therethrough, to the side 138 of power piston 105 with the side 139 being exposed to the chamber 82 which is open to the reservoir 14 so that the power piston 105 is caused to compress the spring 125. Power piston 105 slides toward the master cylinder 9 and, through the reaction body 109 and reaction disc 111, provides force for the movement of primary piston As pressure is applied to wheel brakes 36 and 37 via displacement of primary piston 84, a reaction force is applied to the reaction disc 111. The reaction disc 111 transmits this reaction force back to reaction body 109 and reaction piston 104. The force distribution between these two components is determined by the relative diameter of each. As master cylinder pressure continues to build, a point is reached where the reaction force is sufficient to cause the elastomeric reaction disc 111 to displace into the bore 110 of reaction body 109 and subsequently, to push back the reaction piston 104.

The reaction piston 104 displaces valve plunger 106 in a direction opposite to the direction of the input force on push rod 101. Displacement of valve plunger 106 allows valve body 113 to re-seat on ring 131 which terminates any additional fluid flow from charged chamber 119 to power chamber 121. At this point static equilibrium is achieved such that for a given input force on push rod 101 (which is responsive to the driver's wishes through an interacting brake pedal), there is a prescribed master cylinder pressure in chambers 92 and 99, and a prescribed booster pressure in power chamber 121. The relationship of input force to output force determines the magnitude of the boost assist and the resultant pedal feel. The pedal feel is economically tailored to specific requirements through adjustments of master cylinder and booster bore diameters, as well as the diametral relationship of the reaction disc 111 to the bores 110 and 108 of reaction body 109.

When the manual application of force is removed from push rod 101 the spring 129 causes the valve body 113 to slide within the valve sleeve 112 causing the annular leg 130 to re-engage the ring 31 interrupting the communication of the pressure charge to the side 138 of power piston 105. The element 135 disengages from seat 136 opening a fluid flow path therebetween from the power chamber 121 to the chamber 82 and therethrough, to the reservoir 14. The pressure release from the power chamber 121 permits the spring 124 to return the power piston 105 to the at-rest position illustrated.

Through means of the structure of integral power booster and master cylinder assembly 12 a hydraulically effected power assist is provided for actuation of the master cylinder 9 through the power booster 8. In addition, the pressure charge maintained for operation of the power booster 8 is made available to the traction control and stability enhancement systems for providing direct power booster response to the braking system through the accumulator port 5 and conduit 49.

Referring again to FIG. 1, further operation of the direct power booster response system 10 will be described. The base brake function is accomplished via the stepped bore hydraulic booster 8 supplying the necessary boost force function to the master cylinder 9. The boost pressure energy source is supplied by the accumulator pump assembly 16 which may be optionally utilized with the braking channel 11 providing the function of pump precharge to pump assembly 34 while providing isolation from base brake hydraulic circuits within the scope of the present invention.

In the embodiment of FIG. 1, the pump assembly 16 operates between differential switch points. Below a pre-selected pressure of approximately 500 psi, the accumulator pump assembly 16 will be operated in response to a signal from the ECU 35 until a pre-selected pressure of approximately 700 psi is sensed by the pressure transducer 18 at which time the operation of pump assembly 16 will be ceased. Using this relatively low pressure range of approximately 500–700 psi provides the advantage of using lower cost components such as standardized type O-ring seals within the power booster 8 as opposed to conventional hydraulic boosters which operate at much higher pressure ranges requiring more expensive seals and minimizing tolerances.

Actuation of the master cylinder 9, as assisted by the power booster 8, pressurizes the conduit 40 through output port 6 and the conduit 39 through output port 7. The conduit 40 supplies fluid pressure through the normally open solenoid valve 25 to the rear wheel brake 37 and also through the traction control valve 22 and the normally open solenoid valve 24 to the front wheel brake 36. The normally closed solenoid valves 26 and 27 ensure that the applied pressure is directed to the wheel brakes 36 and 37 during base brake operation. When all valves are in their normal positions, the manual actuation of integral power booster and master cylinder assembly 12 is ensured to effect actuation of the wheel brakes 36 and 37.

For anti-lock brake system operation, a second pump assembly 34 is provided in the present embodiment, in conjunction with a pump inlet accumulator 30. When an associating wheel speed sensor 64 or 65 senses an incipient wheel lock condition, the pump assembly 34 is immediately energized by ECU 35. The normally closed solenoid valves 26 and 27 are energized to provide a pressure release function as required from the respective wheel brakes 36 and 37 and the normally open solenoid valves 24 and 25 are modulated in conjunction with the valves 26, 27 to provide a pressure hold function or to reapply fluid to the wheel brakes 36, 37 as required during anti-lock braking system operation. Pressure release from the wheel brakes 36 and 37 is assisted by the expansible volume provided by the pump inlet accumulator 30. When the ABS cycle is complete, as determined by the ECU 35, the pump assembly 34 is operated an additionally sufficient amount of time to pump any accumulated fluid from the pump inlet accumulator 30.

Traction control system operation is provided through the traction control valve 22 and the pump assembly 34. In addition, first cycle enhancement is provided by the arrangement of the stability enhancement system 23 and the integral power booster and master cylinder assembly 12. The ECU 35 initiates a traction control system cycle when wheel spin is sensed by the wheel speed sensor 64, 65. The pump 34 is immediately brought into operation in concert with shifting of the traction control valve 22 to an energized position such that conduit 42 is closed at the traction control valve 22 and the branch 38 of conduit 40 extending to traction control valve 22 is brought into fluid communication with the branch 28 of conduit 44. This provides fluid supply from the reservoir 14 to the inlet of pump assembly 34.

The fluid drawn from the reservoir 14 is available at the pump assembly 34 for pressurization of the driven wheel brake 36 for effecting a traction control function. Excess pressure is returned to the reservoir 14 through an integral pressure relief in the traction control valve 22. When fluid pressure at wheel brake 36 is sufficient to control slip generated from the accelerating wheel the normally opened solenoid valve 24 and the normally closed solenoid valve 26 are used for additional regulation of braking pressure at the wheel brake 36 to optimize slip control.

First cycle performance enhancement is provided by energizing the integral chassis system valve 20 at the initiation of a traction control system cycle. This opens a flow path from the accumulator chamber 21 through conduit 49, integral chassis system valve 20 and conduit 47 to the pump priming accumulator 32. Additionally, fluid is provided through conduit 61 to an additional pump priming accumulator for a brake channel (not illustrated) supplied through master cylinder output port 7.

The introduction of fluid pressure from the accumulator 15 provides direct power booster response causing the piston 55 to compress spring 54 displacing piston 55 away from end 59 of bore 56 forcing fluid from fluid chamber 57 to the inlet of pump assembly 34. The piston 55 includes a seal 60 maintaining fluid separation between the stability enhancement system 23 and the braking channel 11 in a closed loop manner. At the cessation of a traction control system cycle the pump 34 is continued in operation for a period of time to ensure that any fluid which has accumulated in the pump inlet accumulator 30 is discharged to the reservoir 14.

After the initial energization of the integral chassis system valve 20 to pre-charge the pump assembly 34 the valve is deenergized and returned to its normal position wherein the conduit 47 is placed in registry with the conduit 48 and therethrough, to the reservoir 14 so that the piston 55 is returned to the end 59 of bore 56 by the spring 54 resetting the pump priming accumulator 32. The closed valves 26 and 27 at either wheel may also be pulsed open for a short time to allow pressure equalization of conduit 46 when the piston 55 is reset.

Functioning of the stability enhancement system 23 is provided to impose vehicle path correction such as in the middle of a vehicle turn. The steering angle sensor 67 and wheel speed sensors 64, 65 provide an input for an algorithm to calculate the driver's intentions within the ECU 35 while the lateral accelerometer 68 and yaw rate sensor 69 provide information which is used to determine the actual vehicle behavior. When a variance occurs, outside the scope of prescribed limits, corrective action is taken by the direct power booster response system 10.

For example, in the case of vehicle understeer, a brake pressure may be introduced at the front wheel brake on the same side as the direction of turning to introduce a yaw moment, which will help the vehicle to turn faster and thus compensate for the under-steering condition. As required operational criteria, the wheel brake in question is activated very quickly to effectively initiate the corrective yaw moment as soon as possible. Therefore, the system 10 uses a traction control cycle in conjunction with actuation of the integral chassis system valve 20 to pre-charge the pump assembly 34 for the application of pressure to the required wheel brake, typically in less than 200 milliseconds to achieve 500 psi braking pressure. Any wheel brake that is not being utilized for stability enhancement is closed off by energizing the associating normally open solenoid valve such as normally open solenoid valve 25 so that braking is effected only at the selected wheel brake.

Stability enhancement system supplemental operating pressure is provided through the pump assembly 34 as pre-charged by the pump pre-charge accumulator 32 through the conduit 42. It should also be noted that the stability enhancement cycle may occur either with the driver applying the base brakes or when steering through a curve with no brakes applied. If the driver is already applying the base brakes when a corrective yaw moment is required, system line pressures greater than those applied by the driver will be generated by the stability enhancement cycle to provide control functions. When the stability enhancement system cycle is complete, the pump 34 continues to run for a period of time to ensure that the pump inlet accumulator 30 is emptied of any accumulated fluid.

Through means of the foregoing structure and function, a direct power booster response system is provided wherein wheel brake actuation is automatically effected. The low pressure power booster 8 intervenes directly through the stability enhancement system 23 without actuation of the master cylinder 9. This results in a compact sized system for improved packageability at an optimized cost.

What is claimed is:

1. A direct power booster response system comprising:
    a power booster including an accumulator having a fluid chamber and including a longitudinal bore containing a charged chamber, the charged chamber of the longitudinal bore continuously communicating with the fluid chamber of the accumulator;
    a wheel brake actuable at a rate dependent upon fluid pressure;
    a master cylinder operatively engaging the power booster and selectively operable to generate fluid pressure to actuate the wheel brake;
    a first conduit extending from the master cylinder to the wheel brake wherein the wheel brake is actuatable by the master cylinder through the first conduit;
    a first pump interconnected with the charged chamber of the longitudinal bore operable to maintain a fluid charge in the fluid chamber of the accumulator;
    a second conduit extending between the first pump and the wheel brake wherein the rate at which the wheel brake is actuated is increased in direct response to a transfer of the fluid charge through the second conduit.

2. A direct power booster response system according to claim 1 wherein the first pump operates to maintain the fluid charge in the fluid chamber of the accumulator at a fluid pressure level of between approximately 500 pounds per square inch and 700 pounds per square inch.

3. A direct power booster response system according to claim 1 further comprising an integral chassis system control valve actuatable in response to a programmed event and positioned in the second conduit wherein actuation of the integral chassis system control valve effects selective actuation of the wheel brake in response to at least one of a steering angle sensor, a lateral accelerometer and a yaw rate sensor independent of the master cylinder.

4. A direct power booster response system according to claim 3 further comprising a third conduit extending between the second conduit and the accumulator of the power booster and extending through the power booster and further comprising a pump priming accumulator having a piston separating a first fluid chamber from a second fluid chamber within the pump priming accumulator wherein the first fluid chamber is in open fluid communication through the second conduit with the integral chassis system control valve and wherein the second chamber is in selectively open fluid communication with the wheel brake through the second conduit by opening a normally closed solenoid valve positioned in the second conduit between the pump priming accumulator and the wheel brake, wherein actation of the wheel brake through the integral chassis system control valve results in displacement of the piston in response to the fluid charge in the fluid chamber of the accumulator.

5. A direct power booster response system according to claim 3 further comprising a second pump interconnected with the first conduit wherein the second pump generates a fluid pressure that selectively actuates the wheel brake independent of the master cylinder and independent of the integral chassis system control valve.

6. A direct power booster response system comprising:
    a fluid reservoir;
    a power booster including an accumulator having a fluid chamber and including a longitudinal bore containing a charged chamber, the charged chamber of the longitudinal bore continuously communicating with the fluid chamber of the accumulator, and the power booster including a power chamber selectively communicating with the fluid chamber of the accumulator wherein a power piston is disposed in the longitudinal bore separating the power chamber from a chamber that is in continuously open fluid communication with the reservoir;
    a master cylinder operatively engaging the power booster and selectively manually operable to actuate the wheel brake with power assist from the booster by opening communication between the charged chamber of the accumulator and the power chamber;

a wheel brake actuable at a rate dependent upon fluid pressure;

a first conduit extending from the master cylinder to the wheel brake wherein the wheel brake is actuatable by the master cylinder through the first conduit;

a first pump interconnected with the charged chamber of the longitudinal bore operable to maintain a fluid charge in the fluid chamber of the accumulator;

a second conduit extending between the first pump and the wheel brake wherein the rate at which the wheel brake is actuated is increased in direct response to a transfer of the fluid charge through the second conduit.

7. A direct power booster response system according to claim 6 wherein the first pump operates to maintain the fluid charge in the fluid chamber of the accumulator at a fluid pressure level of between approximately 500 pounds per square inch and 700 pounds per square inch.

8. A direct power booster response system according to claim 6 further comprising an integral chassis system control valve actuatable in response to a programmed event and positioned in the second conduit wherein actuation of the integral chassis system control valve effects selective actuation of the wheel brake in response to at least one of a steering angle sensor, a lateral accelerometer and a yaw rate sensor independent of the master cylinder.

9. A direct power booster response system according to claim 8 further comprising a third conduit extending between the second conduit and the accumulator of the power booster and extending through the power booster and further comprising a pump priming accumulator having a piston separating a first fluid chamber from a second fluid chamber within the pump priming accumulator wherein the first fluid chamber is in open fluid communication through the second conduit with the integral chassis system control valve and wherein the second chamber is in selectively open fluid communication with the wheel brake through the second conduit by opening a normally closed solenoid valve positioned in the second conduit between the pump priming accumulator and the wheel brake, wherein actation of the wheel brake through the integral chassis system control valve results in displacement of the piston in response to the fluid charge in the fluid chamber of the accumulator.

10. A direct power booster response system according to claim 8 further comprising a second pump interconnected with the first conduit wherein the second pump generates a fluid pressure that selectively actuates the wheel brake independent of the master cylinder and independent of the integral chassis system control valve.

11. A direct power booster response system comprising:

a fluid reservoir;

a power booster including an accumulator having a fluid chamber and including a longitudinal bore containing a charged chamber, the charged chamber of the longitudinal bore continuously communicating with the fluid chamber of the accumulator, and the power booster including a power chamber selectively communicating with the fluid chamber of the accumulator wherein a power piston is disposed in the longitudinal bore separating the power chamber from a chamber that is in continuously open fluid communication with the reservoir, and the power booster having an accumulator port opening into the charged chamber;

a master cylinder operatively engaging the power booster and selectively manually operable to actuate the wheel brake with power assist from the booster by opening communication between the charged chamber of the accumulator and the power chamber;

a wheel brake actuable at a rate dependent upon fluid pressure;

a first conduit extending from the master cylinder to the wheel brake wherein the wheel brake is actuatable by the master cylinder through the first conduit;

a first pump interconnected with the charged chamber of the longitudinal bore by connection to the accumulator port the first pump being operable to maintain a fluid charge in the fluid chamber of the accumulator by communicating with the fluid chamber of the accumulator through the accumulator port and the charged chamber so that the fluid chamber and the charged chamber are maintained at a substantially identical fluid pressure level;

a second conduit extending between the first pump and the wheel brake wherein the rate at which the wheel brake is actuated is increased in direct response to a transfer of the fluid charge through the second conduit.

12. A direct power booster response system according to claim 11 further comprising an integral chassis system control valve actuatable in response to a programmed event and positioned in the second conduit wherein actuation of the integral chassis system control valve effects selective actuation of the wheel brake in response to at least one of a steering angle sensor, a lateral accelerometer and a yaw rate sensor independent of the master cylinder.

13. A direct power booster response system according to claim 12 further comprising a third conduit extending between the second conduit and the accumulator of the power booster and extending through the power booster and further comprising a pump priming accumulator having a piston separating a first fluid chamber from a second fluid chamber within the pump priming accumulator wherein the first fluid chamber is in open fluid communication through the second conduit with the integral chassis system control valve and wherein the second chamber is in selectively open fluid communication with the wheel brake through the second conduit by opening a normally closed solenoid valve positioned in the second conduit between the pump priming accumulator and the wheel brake, wherein actuation of the wheel brake through the integral chassis system control valve results in displacement of the piston in response to the fluid charge in the fluid chamber of the accumulator.

14. A direct power booster response system according to claim 13 wherein the first pump operates to maintain the fluid charge in the fluid chamber of the accumulator at a fluid pressure level of between approximately 500 pounds per square inch and 700 pounds per square inch.

15. A direct power booster response system according to claim 12 further comprising a second pump interconnected with the first conduit wherein the second pump generates a fluid pressure that selectively actuates the wheel brake independent of the master cylinder and independent of the integral chassis system control valve during an anti-lock braking operation.

* * * * *